(12) United States Patent
Fantaske

(10) Patent No.: US 7,876,725 B2
(45) Date of Patent: *Jan. 25, 2011

(54) WIRELESS COMMUNICATION SYSTEM FOR ENABLING COMMUNICATION BETWEEN A MOBILE DEVICE AND A NETWORK DEVICE

(75) Inventor: Steve Fantaske, East York (CA)

(73) Assignee: Psion Teklogix Inc., Mississauga (CA)

(*) Notice: Subject to any disclaimer, the term of this patent is extended or adjusted under 35 U.S.C. 154(b) by 129 days.

This patent is subject to a terminal disclaimer.

(21) Appl. No.: 12/272,991

(22) Filed: Nov. 18, 2008

(65) Prior Publication Data

US 2009/0073947 A1 Mar. 19, 2009

Related U.S. Application Data

(63) Continuation of application No. 11/755,460, filed on May 30, 2007, now Pat. No. 7,457,274, which is a continuation of application No. 11/187,797, filed on Jul. 25, 2005, now Pat. No. 7,230,940, which is a continuation of application No. 09/998,442, filed on Dec. 3, 2001, now Pat. No. 6,922,557.

(51) Int. Cl.
*H04W 4/00* (2009.01)
*H04J 3/24* (2006.01)
*H04L 12/56* (2006.01)

(52) U.S. Cl. .................. 370/328; 370/338; 370/349; 370/395.5; 370/395.52; 370/401

(58) Field of Classification Search ............ 370/285, 370/310, 313, 315, 319, 327, 328–329, 331–334, 370/338, 340–341, 344, 348–350, 371, 400–402, 370/395.3–395.31, 395.43, 395.5, 395.53, 370/392–393, 395.52, 911; 455/41.2, 418–420, 455/422.1, 423–425, 432.1–432.3, 436–451, 455/466, 514, 517, 524–525, 550.1, 552.1, 455/556.2, 557–558, 560–561; 709/202–203, 709/227–228

See application file for complete search history.

(56) References Cited

U.S. PATENT DOCUMENTS 5,485,460 A * 1/1996 Schrier et al. ............... 709/227

(Continued)

OTHER PUBLICATIONS

Bakre, et al., "Implementation and Performance Evaluation of Indirect TCP" IEEE Transactions on Computers, IEEE Inc., New York, US, vol. 46, No. 3, Mar. 1, 1997, pp. 260-278.

Chockalingham, et al., "Performance of TCP on Wireless Fading With Memory" Communications, 1998, ICC 98 Conference Record, 1998 IEEE International Conference on Atlanta Georgia, USA Jun. 7-11, 1998, New York, NY USA, IEEE, US. Jun. 7, 1998, pp. 595-600.

(Continued)

*Primary Examiner*—Meless N Zewdu
(74) *Attorney, Agent, or Firm*—Pearne & Gordon LLP

(57) ABSTRACT

A network controller for facilitating roaming of a mobile wireless communications device between access points communicates with at least one access point over a wired network which, in turn, communicate with a mobile wireless communications device over a wireless network. The network controller includes a data processing system including a protocol stack that facilitates a communication session between the mobile device and a network device on the wired network, and a session table identifying session information for each said communication session. The session information identifies the current access point with which the mobile device is currently associated. The protocol stack updates the session table from session information received from the current access point, maintains a first virtual circuit with the network device, maintains a second virtual circuit with the current access point, and bridges communication between the virtual circuits in accordance with the session information.

18 Claims, 10 Drawing Sheets

U.S. PATENT DOCUMENTS

| | | | |
|---|---|---|---|
| 5,778,189 A * | 7/1998 | Kimura et al. | 395/200.66 |
| 5,958,018 A | 9/1999 | Eng et al. | |
| 6,038,216 A | 3/2000 | Packer | |
| 6,154,461 A * | 11/2000 | Sturniolo et al. | 370/401 |
| 6,161,123 A | 12/2000 | Renouard et al. | |
| 6,208,620 B1 | 3/2001 | Sen et al. | |
| 6,233,624 B1 | 5/2001 | Hyder et al. | |
| 6,272,148 B1 | 8/2001 | Takagi et al. | |
| 6,324,402 B1 | 11/2001 | Waugh et al. | |
| 6,351,469 B1 | 2/2002 | Otani et al. | |
| 6,393,008 B1 | 5/2002 | Cheng et al. | |
| 6,430,395 B2 | 8/2002 | Arazi et al. | |
| 6,452,910 B1 | 9/2002 | Vij et al. | |
| 6,574,239 B1 | 6/2003 | Dowling et al. | |
| 6,587,680 B1 | 7/2003 | Ala-Laurila et al. | |
| 6,678,283 B1 | 1/2004 | Teplitsky | |
| 6,697,871 B1 | 2/2004 | Hansen | |
| 6,834,186 B1 | 12/2004 | Gallagher et al. | |
| 6,922,557 B2 * | 7/2005 | Fantaske | 455/403 |
| 6,947,430 B2 | 9/2005 | Bilic et al. | |
| 6,990,089 B2 | 1/2006 | Benedyk et al. | |
| 7,009,952 B1 * | 3/2006 | Razavilar et al. | 370/331 |
| 7,230,940 B2 * | 6/2007 | Fantaske | 370/338 |
| 7,408,942 B1 * | 8/2008 | Allahwerdi | 370/401 |
| 7,457,274 B2 * | 11/2008 | Fantaske | 370/338 |
| 2003/0035407 A1 | 2/2003 | Govindarajan et al. | |
| 2003/0114158 A1 * | 6/2003 | Soderbacka et al. | 455/436 |

OTHER PUBLICATIONS

Rivadeneyra, et al., "A Communication Architecture to Access Data Services Through GSM" INDC. IFIP/ICCC Conference on Information Networks and Data Communications, Jun. 15, 1998, pp. 1-11.

Chim, et al., "End-To-End Acknowledgements for Indirect TCP Over Wireless Internetworks", Communications, Computer and Signal Processing, 1997, 10 Years PACRIM 1987-1997, Networking the Pacific Rim, 1997 IEEE Pacific Rim Conference on Victoria, BC, Canada, Aug, 20-22, 1997, New York, NY USA IEEE pp. 774-777.

Hossain, E., et al., "TCP Performance in WCDMA-Based Cellular Wireless IP Networks", IEEE, 2000, pp. 167-172.

* cited by examiner

WIRELESS COMMUNICATION SYSTEM FOR ENABLING COMMUNICATION BETWEEN A MOBILE DEVICE AND A NETWORK DEVICE

RELATED APPLICATIONS

This patent application is a continuation of U.S. application Ser. No. 11/755,460, filed May 30, 2007 now U.S. Pat. No. 7,457,274 which is a continuation of U.S. application Ser. No. 11/187,797, filed Jul. 25, 2005 and issued as U.S. Pat. No. 7,230,940, which is a continuation of U.S. application Ser. No. 09/998,442, filed Dec. 3, 2001 and issued as U.S. Pat. No. 6,922,557.

FIELD OF THE INVENTION

The present invention relates to a wireless communication system. In particular, the present invention relates to a system and a method for communication between a wireless terminal and an access point.

BACKGROUND OF THE INVENTION

The conventional method for facilitating communication between a wireless terminal and a destination computer over a wireless network involves using Transmission Control Protocol (TCP) (RFC 793, Defense Advanced Research Projects Agency) and Internet Protocol (IP) (RFC 791, Defense Advanced Research Projects Agency) over IEEE standard 802.11 protocol. According to this method, the remote land-based computer network associated with the destination computer has a wireless access point server (AP) to allow the destination computer to receive and transmit message data over the wireless network. The wireless terminal would typically run one or more application processes, a TCP layer, an IP layer and a 802.11 layer. The destination computer typically would run one or more application processes, a TCP layer, an IP layer and a IEEE 802.3 layer. The AP typically would run an IEEE 802.3 layer and a 802.11 layer to bridge communications between the wireless terminal and the destination computer.

The application process on the wireless terminal seeking to communicate with a destination process on the destination computer passes message data (eg. via HTTP) to the 802.11 layer via the TCP and IP layers. The 802.11 layer on the wireless terminal then transmits the message data to the 802.11 layer on the AP over the wireless network. Upon receipt of the message data, the 802.11 layer on the AP passes the message data to the 802.3 layer on the AP for retransmission over the land-based computer network. The 802.3 layer on the destination computer passes the message data to the TCP layer (via the IP layer) on the destination computer to verify that the message data was properly received.

If the message data was properly received, the TCP layer on the destination computer passes the data to the application layer, and generates an Acknowledgement (ACK) segment for transmission over the land-based network to the AP. Upon receipt of the ACK, the AP transmits the segment to the wireless terminal over the wireless network. If the TCP layer on the wireless terminal does not receive the ACK segment within a predetermined timeout interval, the TCP layer on the wireless terminal retransmits the message data again.

Although IEEE 802.11 in conjunction with TCP/IP has proven to be useful for facilitating communication between a wireless terminal and a destination computer, both the TCP and the IP layers were designed to facilitate data transmission only over land-based hardwired computer networks. Consequently, if the TCP layer on the wireless terminal does not receive an ACK segment within the predetermined timeout interval the TCP layer assumes that the transmission problem is due to network congestion and increases the interval between segment retransmissions until the ACK segment is finally received. Although this solution may be prudent for data transmission only over land-based hardwired computer networks, this solution can degrade communication performance over wireless networks since the lack of receipt of an ACK segment in a wireless network may be due to the wireless terminal simply drifting out of range of the AP.

Other attempts have been made to provide wireless communication solutions. For instance, one solution, referred to as "Mobile IP", uses a "home agent server" in communication with the "home" AP associated with the "home" IP sub-net of a wireless terminal, and a "foreign agent server" in communication with the "foreign" AP associated with a "foreign" IP sub-net. When the wireless terminal is located within the home IP sub-net communications area, the home agent server forwards to a destination computer communications datagrams transmitted by the wireless terminal. However, when the wireless terminal roams to the foreign IP sub-net communications, the foreign agent server recognizes that the IP address of the communications datagrams transmitted by the wireless terminal are associated with the home IP sub-net, and forwards the received datagrams to the home agent server for transmission to the destination computer. Although this solution allows a wireless terminal to roam between IP sub-nets, this solution can degrade communication performance due to the communications processing overhead required to recognize and forward datagrams from a foreign agent server to the home agent server. Further, this solution does not address the TCP retransmission problem, discussed above.

Another solution, referred to as "UDP-Plus", replaces the TCP layer with a User Datagram Protocol (UDP) layer, and includes a retransmission protocol layer between the application process and the UDP layer. With this solution, if a UDP datagram is not received by the destination process, the retransmission protocol layer of the wireless terminal causes the UDP datagram to be retransmitted until receipt of the UDP datagram is confirmed. However, this solution is deficient in that it increases the resource requirements for the wireless terminal, and does not address the reason for the failed transmission.

Therefore, there remains a need for a data communication system which is optimized for communication over wireless networks.

SUMMARY OF THE INVENTION

According to a first aspect of the present invention, there is provided a wireless communication device, and a method of wireless data communication between a wireless network communications device and a land-based network resource.

The wireless communication device, according to the first aspect of the present invention, includes an antenna configured for wireless communication over a wireless network, and a data processing system in communication with the antenna. The data processing system includes a protocol stack for facilitating the wireless communication with a network resource via the wireless network. The protocol stack includes an intermediate protocol layer which is configured to monitor a transmission of message datagrams directed to the network resource from the antenna and to initiate retransmission of unsuccessfully transmitted datagrams at a retransmission rate based on a running average of acknowledgment times for successfully transmitted datagrams.

The method of wireless data communication, according to the first aspect of the present invention, includes the steps of (1) providing a wireless communication device, and providing a network resource and an access server in communication with the network resource over a land-based network for facilitating communication between the wireless communication device and the network resource; (2) initiating transmission of message datagrams from the wireless communication device to the access server; (3) at the wireless communication device monitoring successful transmission of the message datagrams over the wireless network; and (4) at the wireless communication device initiating retransmission of unsuccessfully transmitted message datagrams at a retransmission rate based on a running average of acknowledgment times for successfully transmitted message datagrams.

According to a second aspect of the present invention, there is provided an access server for facilitating communication between a network resource interfacing with the access server over a land-based network and a wireless communications device interfacing with the access server over a wireless network. According to the second aspect of the present invention, there is also provided a method of wireless data communication between at least one land-based network resource and at least one wireless network communications device.

The access server, according to the second aspect of the present invention, includes a network interface for communicating with the network resource over the land-based network, an antenna for communicating with the wireless communications device over the wireless network, and a data processing system in communication with the network interface and the antenna. The data processing system includes a protocol stack comprising a first physical protocol layer for facilitating communication over the wireless network, an intermediate protocol layer in communication with the first physical protocol layer, a second physical protocol layer for facilitating communication over the land-based network, and an application protocol layer in communication with the intermediate protocol layer and the second physical protocol layer for mapping message data between the wireless communications device and the network resource.

The method of wireless data communication, according to the second aspect of the present invention, includes the steps of (1) providing at least one network resource and an access server in communication with the network resource over a land-based network for facilitating communication between at least one wireless communication device and the at least one network resource; (2) at the access server receiving over the wireless network a wireless-based message datagrams from the at least one wireless communication device intended for transmission to the at least one network resource; (3) at the access server initiating transmission over the wireless network of an acknowledgement datagrams to the at least one wireless communications device in response to a successful reception of the received wireless-based message datagrams; and (4) directing the successfully received wireless-based message datagrams to the at least one network resource over the land-based network.

According to a third aspect of the present invention, there is provided a data structure for facilitating wireless communication over a wireless network. The data structure includes a message, a transport layer data segment encapsulating the message, and a link layer datagram encapsulating the transport layer data segment. The link layer datagram comprises a datagrams sequence number and a message class indicator.

According to a fourth aspect of the present invention, there is provided a network controller for facilitating roaming of a mobile wireless communications device between access points. According to the fourth aspect of the invention, there is also provided a method of facilitating roaming of a mobile wireless communications device between access points, and a computer readable medium for effecting the method.

The network controller, according to the second aspect of the present invention, includes a network interface for communicating with at least one access point over a wired network, and a data processing system in communication with the network interface. The access points are configured for communication with a mobile wireless communications device over a wireless network. The data processing system includes a protocol stack for facilitating a communication session between the mobile device and a network device on the wired network, and a session table identifying session information for each said communication session. The session information identifies the access point with which the mobile device is currently associated.

The protocol stack is configured to update the session table from the session information received from the current one access point. The protocol stack comprises:
(i) a first protocol layer configured to maintain a first virtual circuit between the network controller and the network device;
(ii) a second protocol layer configured to communicate with the current one access point over a second virtual circuit between the network controller and the current one access point; and
(iii) an intermediate protocol layer in communication with the first and second protocol layers and configured to bridge communication between the virtual circuits in accordance with the session information.

The method of facilitating roaming of a mobile wireless communications device, according to the fourth aspect of the present invention, includes the steps of (1) at a network controller in communication with at least one access point via a wired network, periodically receiving from a current one of the access points with which a mobile wireless communications device is currently associated, session information associated with a communication session between the mobile device and a network device on the wired network, the current one access point being in communication with the mobile device over a wireless network; (2) at the network controller, maintaining a first virtual circuit between the network controller and the network device, and maintaining a second virtual circuit between the network controller and the current one access point; and (3) at the network controller, bridging communication between the virtual circuits in accordance with the session information.

The computer-readable medium, according to the fourth aspect of the present invention, includes computer processing instructions for a network controller, the network controller being configured for communication with at least one access point and a network device via a wired network, the computer processing instructions when executed causing the network controller to perform the steps of (1) periodically receiving from a current one of the access points with which a mobile wireless communications device is currently associated, session information associated with a communication session between the mobile device and the network device, the current one access point being in communication with the mobile device over a wireless network; (2) maintaining a first virtual circuit with the network device, and maintaining a second virtual circuit with the current one access point; and (3) bridging communication between the virtual circuits in accordance with the session information.

In accordance with a preferred embodiment of the invention, a wireless communication device and a network wireless access server are each fitted with an antenna configured for wireless communication over a wireless network, and a data processing system in communication with the antenna. Each data processing system includes a protocol stack comprising a physical protocol layer, an application protocol layer, and an intermediate protocol layer in communication with the physical protocol layer and the application protocol layer. Typically, the access server is associated with a destination computer over a land-based computer network.

A message intended for transmission from the wireless communication device to the destination computer is passed to the intermediate protocol layer of the remote communication device from its application software, via the application protocol layer. Upon receipt of the message, the intermediate protocol layer generates one or more datagrams, with each datagrams comprising the message, a transport layer data segment encapsulating the message, and a link layer datagram encapsulating the transport layer data segment. The transport layer data segment includes a transport layer header comprising a source message identifier assigned by an originator of the data segment, a destination message identifier assigned by an intended recipient of the data segment, and a radio address uniquely associated with the originator of the data segment. The link layer datagram includes a datagrams sequence number and a message class indicator.

Once each datagrams is defined, the intermediate protocol layer passes the datagrams to the physical protocol layer for transmission to the access server associated with the destination computer. The intermediate protocol layer also waits for a receipt acknowledge generated by the access server indicating successful receipt of the datagrams by the access server. Typically, each datagrams is transmitted to the access server at a transmission rate based on a running average of the time between the instant of transmission of a datagrams and the instant of receipt of an acknowledgement for successfully transmitted datagrams. However, if a datagrams is not properly acknowledged, the intermediate protocol layer of the remote communication device continues to retransmit the unsuccessfully transmitted datagrams at a retransmission rate determined in accordance with a predetermined exponentially increasing retransmission interval based on the running average.

Upon successful receipt of the transmitted datagrams at the intermediate protocol layer of the access server, the intermediate protocol layer extracts the destination address from the datagrams and passes the datagrams to the physical protocol layer for transmission to the destination computer over the land-based network in accordance with the extracted destination address.

BRIEF DESCRIPTION OF THE DRAWINGS

The present invention will now be described, by way of example only, with reference to the accompanying drawings, in which.

DETAILED DESCRIPTION OF THE PREFERRED EMBODIMENTS

Before describing the preferred embodiments of the present invention, it is instructive to first describe in detail a conventional mechanism presently used for facilitating wireless communication between a wireless terminal and a destination computer over a wireless network. As used throughout this specification, the word "comprising" is intended to be synonymous with the word "including".

Figure 1:
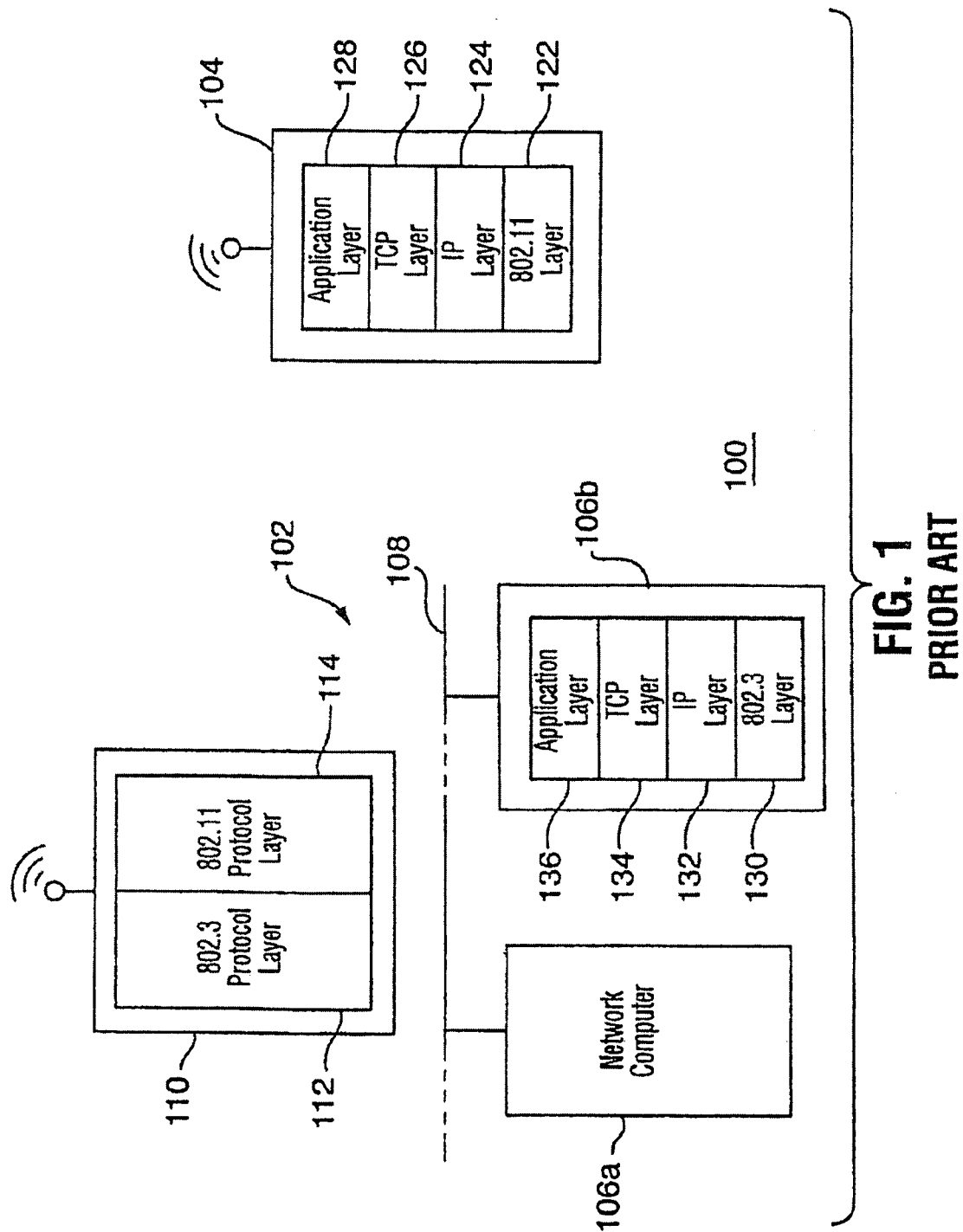
FIG. 1 is a schematic view of a prior art wireless communication system.

Commencing then with FIG. 1, a conventional wireless communication system, denoted generally as 100, is shown comprising a computer network 102 and at least one wireless terminal 104 for communicating with the computer network 102. The computer network 102 comprises a plurality of networked computers 106 (shown individually in FIG. 1 as 106a, 106b), a network backbone 108 interconnecting the networked computers 106, and a wireless access point server 110 coupled to the network backbone 108 for facilitating wireless communication between the wireless terminal 104 and any of the networked computers 106. Typically, the network backbone 108 would comprise Ethernet cable, although other network technologies may be used as will be apparent to those skilled in the art.

Typically, the access point server 110 is provided with a protocol stack comprising an IEEE 802.3 (Ethernet) protocol layer 112 and an IEEE 802.11 protocol layer 114. The wireless terminal 104 typically includes a protocol stack typically comprising an 802.11 protocol layer 122, an IP protocol layer 124 over the 802.11 protocol layer 122, a TCP protocol layer 126 over the IP protocol layer 124, and an application protocol layer 128 over the TCP protocol layer 126. Each of the networked computers 106 typically include a protocol stack typically comprising an 802.3 protocol layer 130, an IP protocol layer 132 over the 802.3 protocol layer 130, a TCP protocol layer 134 over the IP protocol layer 132, and an application protocol layer 136 over the TCP protocol layer 134.

To transmit a message from the wireless terminal 104 to one of the networked computers 106, message data is prepared using suitable application software on the wireless terminal 104, and then passed from the application protocol layer 128 of the wireless terminal 104 to the TCP protocol layer 126. Upon receipt of the message data, the TCP protocol layer 126 on the wireless terminal 104 formats the message data into one or more TCP segments, each having a TCP header incorporating a source port number associated with the application software on the wireless terminal 104 and a destination port number associated with application software on the destination computer 106. Each TCP header also includes a control word which identifies the contents of the data being transmitted, and a unique sequence number which allows the TCP protocol layer 134 on the destination computer 106 to correctly reorder any TCP segments that may have been received out of order and to eliminate duplicate segments.

Once formatted, the TCP protocol layer 126 on the wireless terminal 104 passes the TCP segments to the IP protocol layer 124 on the wireless terminal 104. The initial series of TCP segments include control words which allow the TCP protocol layer 126 on the wireless terminal 104 to establish a logical circuit with the TCP protocol layer 134 on the destination computer 106. Upon receipt of the TCP segments, the IP protocol layer 124 on the wireless terminal 104 formats the TCP segments into IP datagrams, each having an IP header identifying the network address of the destination computer 106 and the network address of the wireless terminal 104. The IP protocol layer 124 then passes the IP datagrams to the IEEE 802.11 protocol layer 122 on the wireless terminal 104 for wireless transmission to the destination computer 106.

The 802.11 protocol layer 122 uses a Carrier Sense Multiple Access with Collision Avoidance (CSMA/CA) scheme to determine when it is safe to transmit the received message. According to this scheme, the 802.11 protocol layer 122 on the wireless terminal 10 uses the presence of the carrier signal produced by the access point 110 to determine whether the access point is communicating with another wireless terminal 104. If the terminal 104 determines that the access point 110 is already communicating with another wireless terminal 104, the terminal 104 randomly selects a "backoff" interval to wait before attempting to communicate with the access point 110 again. The "backoff" interval is randomly selected to reduce the likelihood of multiple wireless terminals attempting to simultaneously communicate with the same access point 110 (ie the occurrence of a "collision"). If, at the end of the "backoff" interval, the terminal 104 determines that the access point 110 is still busy, the terminal 104 randomly selects an exponentially larger "backoff" interval.

When the wireless terminal 104 determines that the access point server 110 is free to communicate with the terminal 104, the 802.11 protocol layer 122 on the terminal 104 transmits a Request to Send (RTS) frame which includes the duration (in time) of the intended message data. If the access point server 110 is still free, the 802.11 protocol layer 114 on the access point 110 transmits a Clear to Send (CTS) frame which includes the same duration information. All other terminals which receive the CTS frame use the duration information to determine the next instant during which the access point 110 might be free.

When the 802.11 protocol layer 122 on the wireless terminal 104 receives the CTS frame, the 802.11 protocol layer 124 formats the IP datagrams into data frames, each having a frame header identifying the physical address of the destination computer 106 and the physical address of the wireless terminal 104, and then transmits the data frames as RF data for receipt by the access point 110. Upon receipt of the data frames, the 802.11 protocol layer 114 on the access point 110 verifies the integrity of the received data frames, and then passes the data frames to the 802.3 protocol layer 112 for retransmission over the network backbone 108.

Upon receipt of the data frames, the 802.3 protocol layer on the destination computer 106 verifies the integrity of each received data frame, removes the frame header from the data frames, and passes the resulting IP datagrams to the IP protocol layer 132 of the destination computer 106. Once the IP protocol layer 132 verifies from the network address identified in the IP datagrams that the received IP datagrams are intended for the destination computer 106, the IP protocol layer 132 removes the IP header from the IP datagrams and passes the extracted TCP segments to the TCP protocol layer 134.

The control words of the TCP segments initially received by the IP protocol layer 132 will typically indicate that the TCP protocol layer 126 on the wireless terminal 104 wishes to establish a virtual circuit with the TCP protocol layer 134 on the destination computer 106 over which subsequent TCP segments will be transmitted. Once the virtual circuit is established (by the TCP protocol layer 126 on the wireless terminal 104 and the TCP protocol layer 132 on the destination computer 106 exchanging starting sequence numbers), the TCP protocol layer 134 sends the wireless terminal 104 an ACK segment (via the access point server 110) for each data segment properly received. The TCP protocol layer 132 then reassembles all the TCP message data segments subsequently received over the virtual circuit, and then passes the reconstructed message to the appropriate application software via the application protocol layer 136, as dictated by the destination port number included with the TCP header. As will be apparent from the foregoing description, the TCP protocol layers maintain a virtual communications circuit between the wireless terminal 104 and the destination computer 106, with the access point 110 in effect merely acting as a bridge between the wireless terminal 104 and the destination computer 106.

As discussed above, if the TCP protocol layer 126 on the wireless terminal 104 does not receive an Acknowledge (ACK) segment within a predetermined timeout interval (indicating that the TCP segment was successfully received at the destination computer 106), the TCP protocol layer 126 on the wireless terminal 104 will repeatedly increase the timeout interval and attempt retransmission until the TCP segment is successfully transmitted. Since the lack of receipt of an ACK segment may be due simply to the wireless terminal 104 temporarily drifting out of range of the access point 110, the conventional wireless access scheme, discussed above, can introduce unnecessary delays in the re-establishment of communication between the wireless terminal 104 and the destination computer 106.

In addition, since the lack of receipt of an ACK segment may be due to a communication problem with the network backbone 108, the requirement that transmission (and hence retransmission) occur over the virtual circuit established between the wireless terminal 104 and the destination computer 106 makes inefficient use of available bandwidth. Further, the large TCP/IP header length (about 40 bytes) further contributes to the inefficient use of available bandwidth. The wireless communication system, according to the present invention, addresses these deficiencies by replacing the TCP protocol layers and the IP protocol layers on the wireless terminal 104 and the access point 106 with a novel protocol layer intermediate the application protocol layers and the 802.11 protocol layers.

Figure 2:
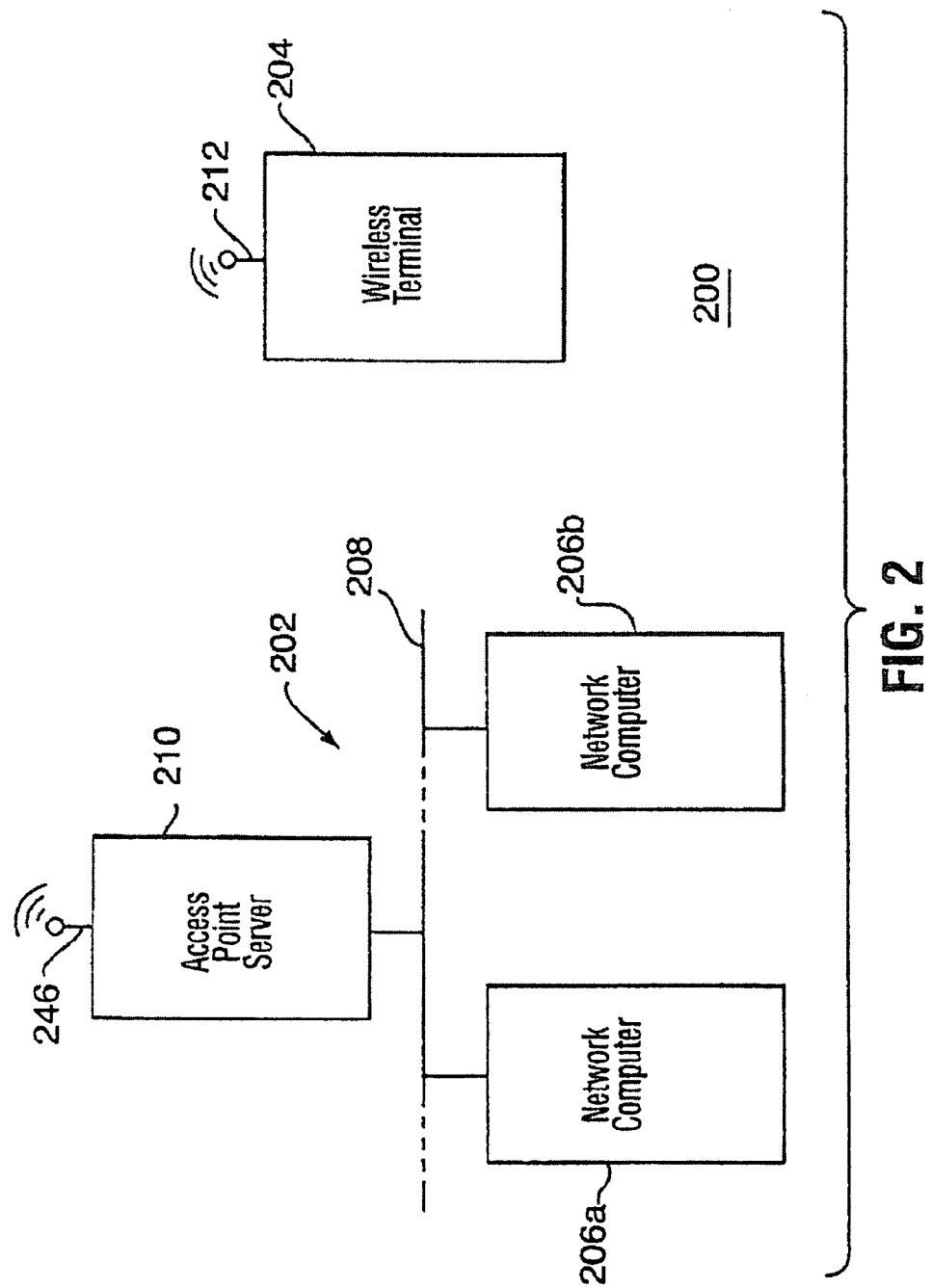
FIG. 2 is a schematic view of the wireless communication system, according to one embodiment of the present invention, showing the networked computers, the access point server, and the wireless terminal.

A wireless communication system, according to a first embodiment of the present invention, will now be described with reference to FIG. 2. As shown, the wireless communication system, denoted generally as 200, comprises a computer network 202 and at least one wireless terminal 204 for communicating with the computer network 202. The computer network 202 comprises a plurality of networked computers 206 (shown individually as 206a, 206b), a network backbone 208 interconnecting the networked computers 206, and a wireless access point server 210 coupled to the network backbone 208. Typically, the network backbone 208 comprises Ethernet cable, although other network technologies may be used as will be apparent to those skilled in the art.

Figure 3:
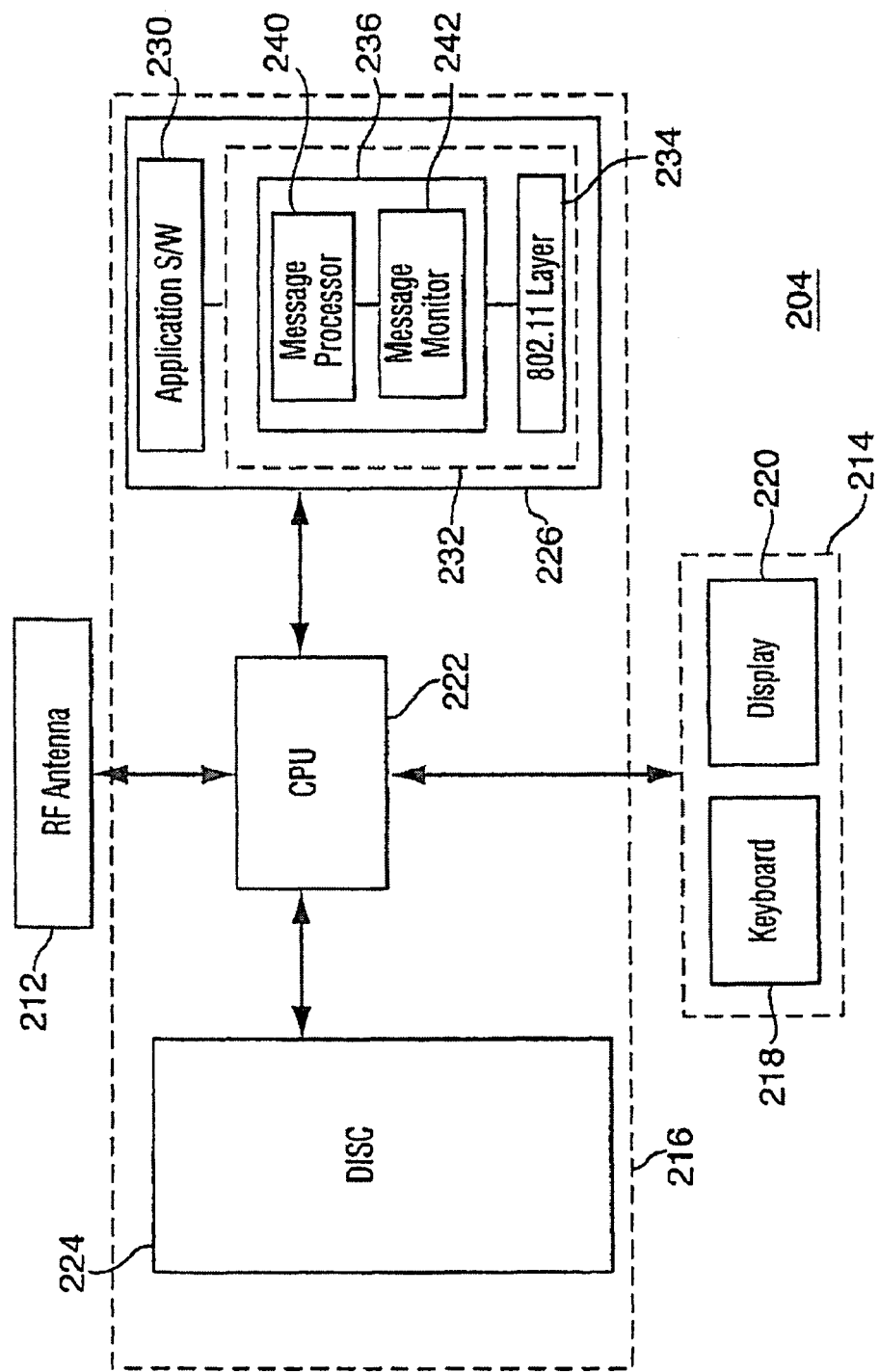
FIG. 3 is a schematic view of the wireless terminal shown in FIG. 2.

The wireless terminal 204 is configured for wireless communication with the access point terminal 210 over a wireless network (not shown). Typically the wireless terminal 204 is provided on a single electronic communications device, and comprises a wireless-enabled communications device, such as a personal data assistant, a cellular telephone, or another wireless communications device, as will be apparent to those skilled in the art. As shown in FIG. 3, the wireless terminal 204 comprises an RF antenna 212 for wireless communication over the wireless network, a user interface 214, and a data processing system 216 in communication with the antenna 212 and the user interface 214. Preferably, the user interface 214 comprises a data entry device 218 (such as keyboard, microphone or writing tablet), and a display device 220 (such as a CRT or LCD display).

The data processing system 216 includes a central processing unit (CPU) 222 in communication with the antenna 212 and the user interface 214, and a non-volatile memory storage device (DISC) 224 (such as a magnetic disc memory or electronic memory) and a read/write memory (RAM) 226 both in communication with the CPU 222. The DISC 224 includes instructions which, when loaded into the RAM 226, comprise processor instructions for the CPU 224.

The processor instructions define in the RAM 226 one or more application software modules 230, and a protocol stack 232 in communication with the application software 230. The protocol stack 232 is configured in accordance with the Open Systems Interconnect (OSI) networking model well known to those skilled in the art, and comprises an 802.11 protocol layer 234, and an intermediate protocol layer 236 in communication with the 802.11 protocol layer 234 and the application software 230. In the OSI model, the 802.11 protocol layer 234 occupies the physical layer and the MAC sublayer of the data link layer, and the intermediate protocol layer 236 occupies the LLC sublayer of the data link layer, the network layer and the transport layer. The inventors have named the intermediate protocol layer 236 as "802.IQ" and, therefore, this latter terminology will be used throughout the remainder of this patent specification.

The 802.IQ protocol layer 236 comprises a memory object defining a message processor 240, and a memory object defining a message monitor 242. However, although the message processor 240 and the message monitor 242 have been described as memory objects, it will be appreciated that they need not be implemented as memory objects, but instead may be implemented in electronic hardware, if desired.

In the OSI model, the message processor 240 occupies the transport layer and the network layer. The message processor 240 is configured to receive message data from the application protocol layer 238 and to generate transport layer data segments from the message data. The message processor 240 is also configured to extract the message data from transport layer data segments received from the message monitor 242, and to acknowledge the receipt of the transport layer data segments by generating transport layer ACK data segments upon receipt and successful assembly of the message data contained in the transport layer data segments.

In the OSI model, the message monitor 242 occupies the LLC sublayer of the data link layer. The message monitor 242 is in communication with the message processor 240, and is configured to acknowledge the receipt of link layer datagrams transmitted to the wireless terminal 204 over the wireless network, and to generate link layer datagrams from transport layer data segments received from the message processor 240. The message monitor 242 is also configured to monitor the transmission of the link layer datagrams from the wireless terminal 204 over the wireless network by waiting for the receipt of link layer acknowledgement (ACK) datagrams transmitted by the access point server 210 in response to successful transmissions of the link layer datagrams, and by maintaining a running average of the "transmission acknowledgement times". As used herein, a "transmission acknowledgement time" is the time elapsed between the instant a link layer datagram is transmitted to the access point server 210 over the wireless network from the RF antenna 212, and the instant a link layer ACK datagram is received by the wireless terminal 204 from the access point server 210 over the wireless network in response to the transmitted link layer datagram.

In addition, the message monitor 242 is configured to initiate retransmission of any link layer datagrams which were not received by the access point server 210. To do so, the message monitor 242 is configured such that if it does not receive a link layer ACK datagram within a retransmission time interval (initially equal to the average acknowledgement time), the message monitor 242 initiates retransmission of the link layer datagram again.

Figure 4:
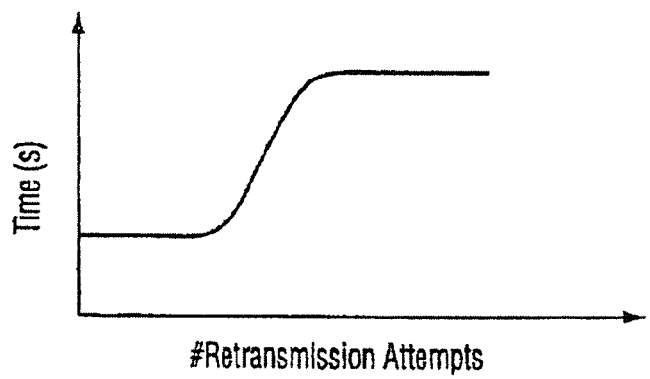
FIG. 4 is a graph depicting the profile of the retransmission interval used for initiating retransmission of datagrams over the wireless network.

As shown in FIG. 4, preferably the message monitor 242 is configured to initiate retransmission of link layer datagrams after expiry of the retransmission interval a predetermined maximum number of times to account for the wireless terminal 204 temporarily drifting out of range of the access point server 210, and then to rapidly increase the retransmission time interval from the average acknowledgement time, after the predetermined number of retransmission attempts, to account for wireless network congestion, interference, or the wireless terminal 204 moving out of range of the access point server 210 for extended periods. However, the message monitor 242 is also configured to cease increasing the retransmission time interval after the retransmission time interval reaches a predetermined upper limit, to limit the delay required before retransmission of a data segment can recommence when the wireless terminal 204 drifts or moves back in range of the access point server 210. Preferably, the message monitor 242 is configured to increase the retransmission time interval exponentially from the average acknowledgement time up to a predetermined maximum limit of about 2 seconds, although other retransmission interval curve profiles and/or other maximum limits may be used, as will be apparent by those of ordinary skill.

Figure 5:
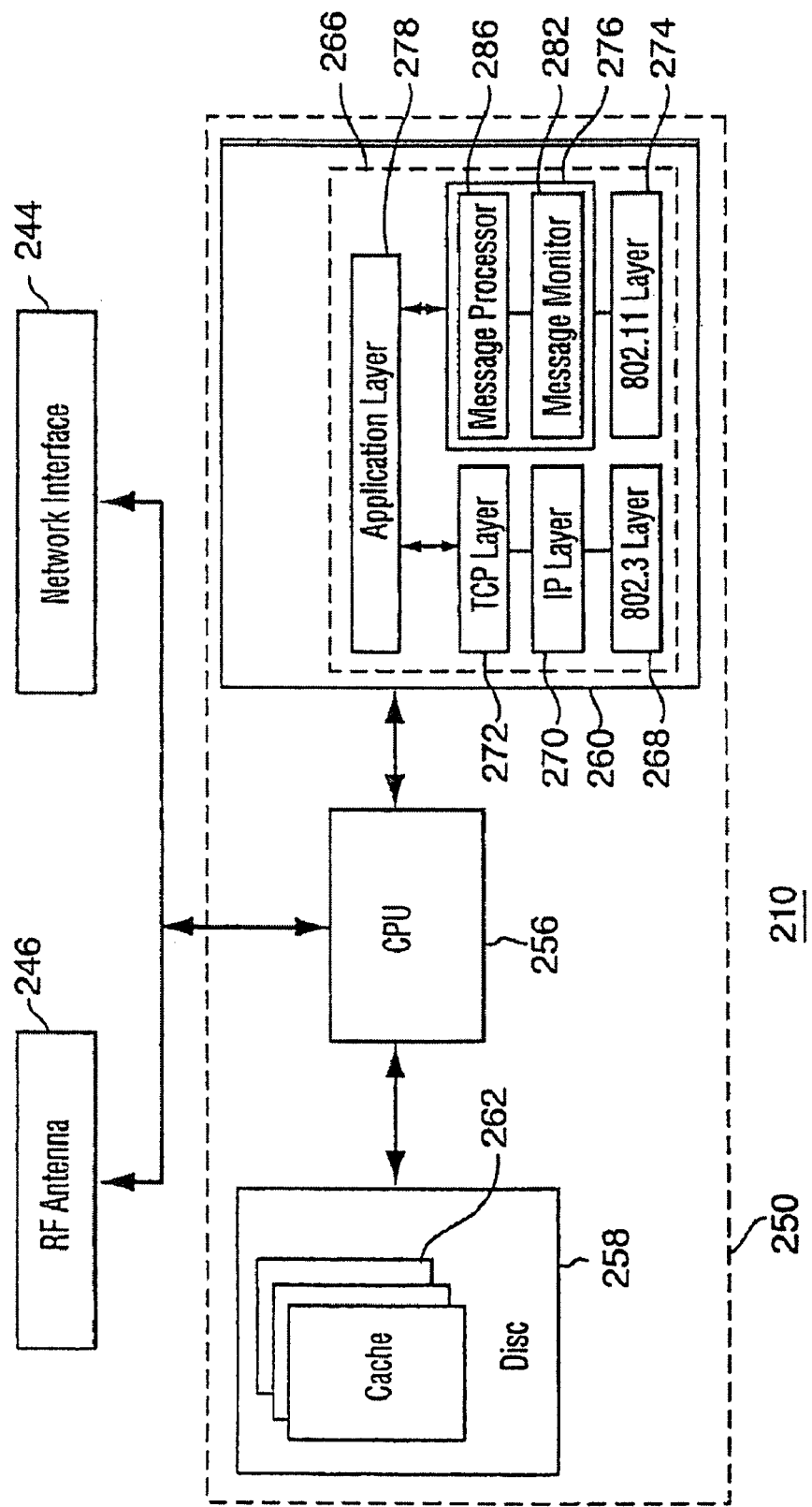
FIG. 5 is a schematic view of the access point server shown in FIG. 2.

As shown in FIG. 5, the access point server 210 is configured for wireless communication with the wireless terminal 204 over the wireless network and for land-based communication with any of the networked computers 206 over the network backbone 208. Typically the access point server 210 is provided on a single electronic communications device, and comprises a wireless-enabled networked computer server. The access point server 210 comprises a network interface 244 for land-based communication over the network backbone 208, an RF antenna 246 for wireless communication over the wireless network, and a data processing system 250 in communication with the network interface 244 and the antenna 246.

The data processing system 250 includes a central processing unit (CPU) 256 in communication with the network interface 244 and the antenna 246. The data processing system 250 also includes a non-volatile memory storage device (DISC) 258, such as a magnetic disc memory or electronic memory, and a read/write memory (RAM) 260 both in communication with the CPU 256. The DISC 258 includes an address cache 262 which includes wireless terminal "radio addresses" and "session numbers" for identifying application software 230 and wireless terminals 204 to the access point server 210. The address cache 262 also includes "terminal numbers" and IP addresses for identifying application software and networked computers 206 to the access point server 210. Terminal numbers will be discussed with reference to FIG. 6. Radio numbers and session numbers will be discussed with reference to FIG. 7a.

The DISC 258 also includes instructions which, when loaded into the RAM 260, comprise processor instructions for the CPU 256. The processor instructions define in the RAM 260 a protocol stack 266 configured in accordance with the OSI networking model. The protocol stack 266 comprises an 802.3 protocol layer 268, an IP protocol layer 270 in communication with the 802.3 protocol layer 268, a TCP protocol layer 272 in communication with the IP protocol layer 270, an 802.11 protocol layer 274, an 802.IQ protocol layer 276 in communication with the 802.11 protocol layer 274, and an application protocol layer 278 in communication with the TCP protocol layer 272 and the 802.IQ protocol layer 276.

The 802.3 protocol layer 268 occupies the physical layer and the MAC sublayer of the data link layer of the standard OSI model; the IP protocol layer 270 occupies the network layer and the LLC sublayer of the data link layer; and the TCP protocol layer 272 occupies the transport layer and the network layer. The application protocol layer 278 is configured to map message data between the 802.IQ protocol layer 276 and TCP ports on the destination networked computers 206 using the aforementioned radio numbers, session numbers and terminal numbers.

The 802.IQ protocol layer 276 comprises a memory object defining a message processor 280, and a memory object defining a message monitor 282. However, although the message processor 280 and the message monitor 282 have been described as memory objects, it will be appreciated that they need not be implemented as memory objects, but instead may be implemented in electronic hardware, if desired.

In the OSI model, the message processor 280 occupies the transport layer and the network layer. The message processor 280 is configured to receive message data which originated from the networked computers 206 and to generate transport layer data segments from the message data. The message processor 280 is also configured to extract the message data from transport layer data segments received from the message monitor 282, and to acknowledge the receipt of the transport layer data segments by generating transport layer ACK data segments upon receipt and successful assembly of the message data contained in the transport layer data segments.

In the OSI model, the message monitor 282 occupies the LLC sublayer of the data link layer. The message monitor 282 is in communication with the message processor 280, and is configured to acknowledge the receipt of link layer datagrams transmitted to the access point server 210 over the wireless network, and to generate link layer datagrams from transport layer data segments received from the message processor 280. The message monitor 282 is also configured to monitor the transmission of the link layer datagrams from the access point server 210 over the wireless network by waiting for the receipt of link layer acknowledgement (ACK) datagrams transmitted by the wireless terminals 204 in response to successful transmissions of the link layer datagrams, and by maintaining a running average of the transmission acknowledgement times for link layer datagrams which the access point server 210 successfully transmitted to the wireless terminal 204.

In addition, the message monitor 282 is configured to initiate retransmission of any link layer datagrams which were not received by the wireless terminal 204. To do so, the message monitor 282 is configured such that if it does not receive a link layer ACK datagram within a retransmission time interval (initially equal to the average acknowledgement time for link layer datagrams which the access point server 210 successfully transmitted to the wireless terminal 204), the message monitor 282 initiates retransmission of the link layer datagram again. As above, preferably the message monitor 282 is configured to initiate retransmission of the link layer datagrams after expiry of the original retransmission time interval (for the transmission of link layer datagrams to the wireless terminal 204), and then to increase the retransmission time interval from the average acknowledgement time, after a predetermined number of retransmission attempts, up to a predetermined upper limit time.

Figure 6A:
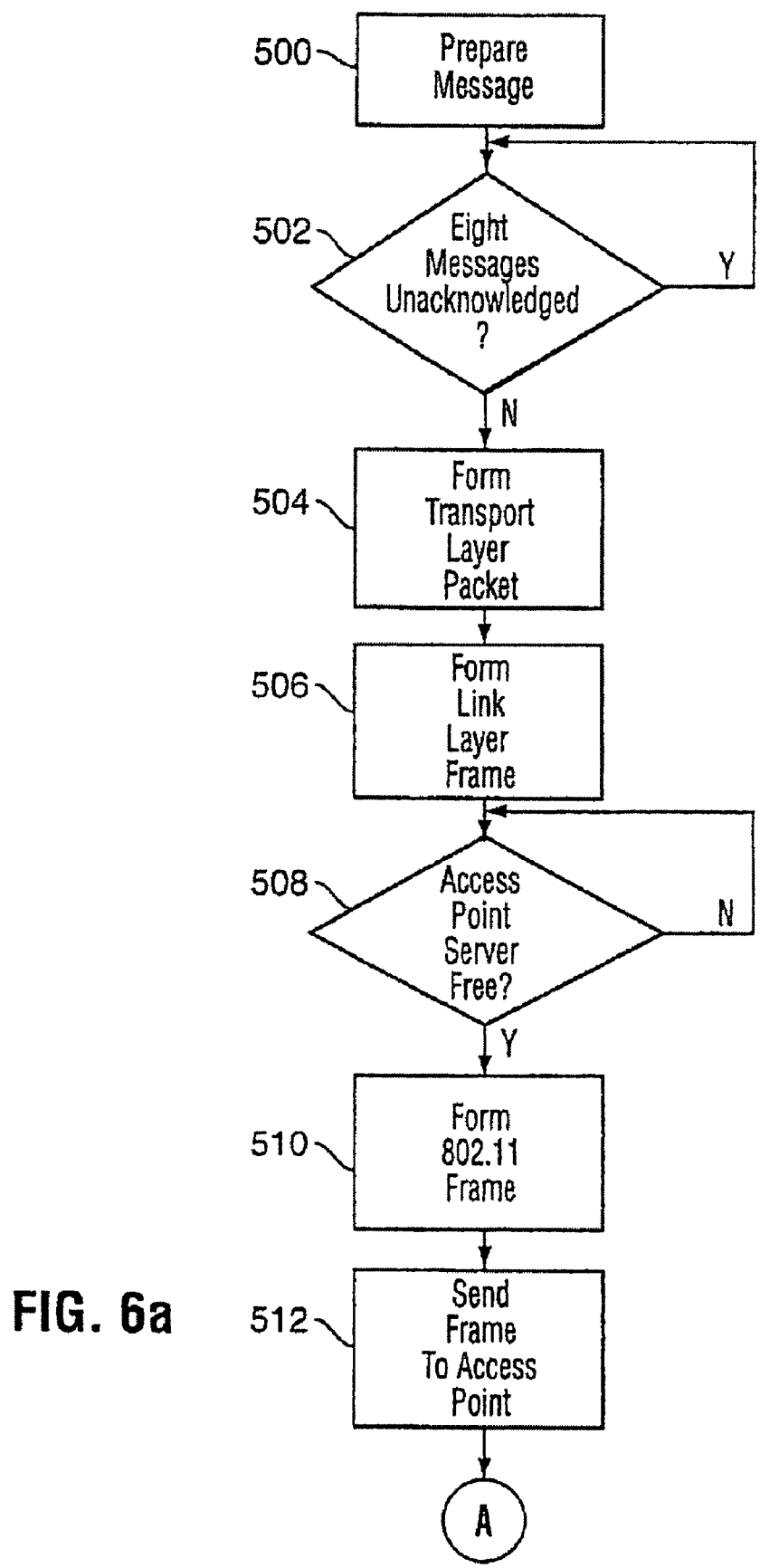
FIGS. 6a and 6b together comprise a flowchart depicting the method of operation of the wireless communication system.
Figure 6B:
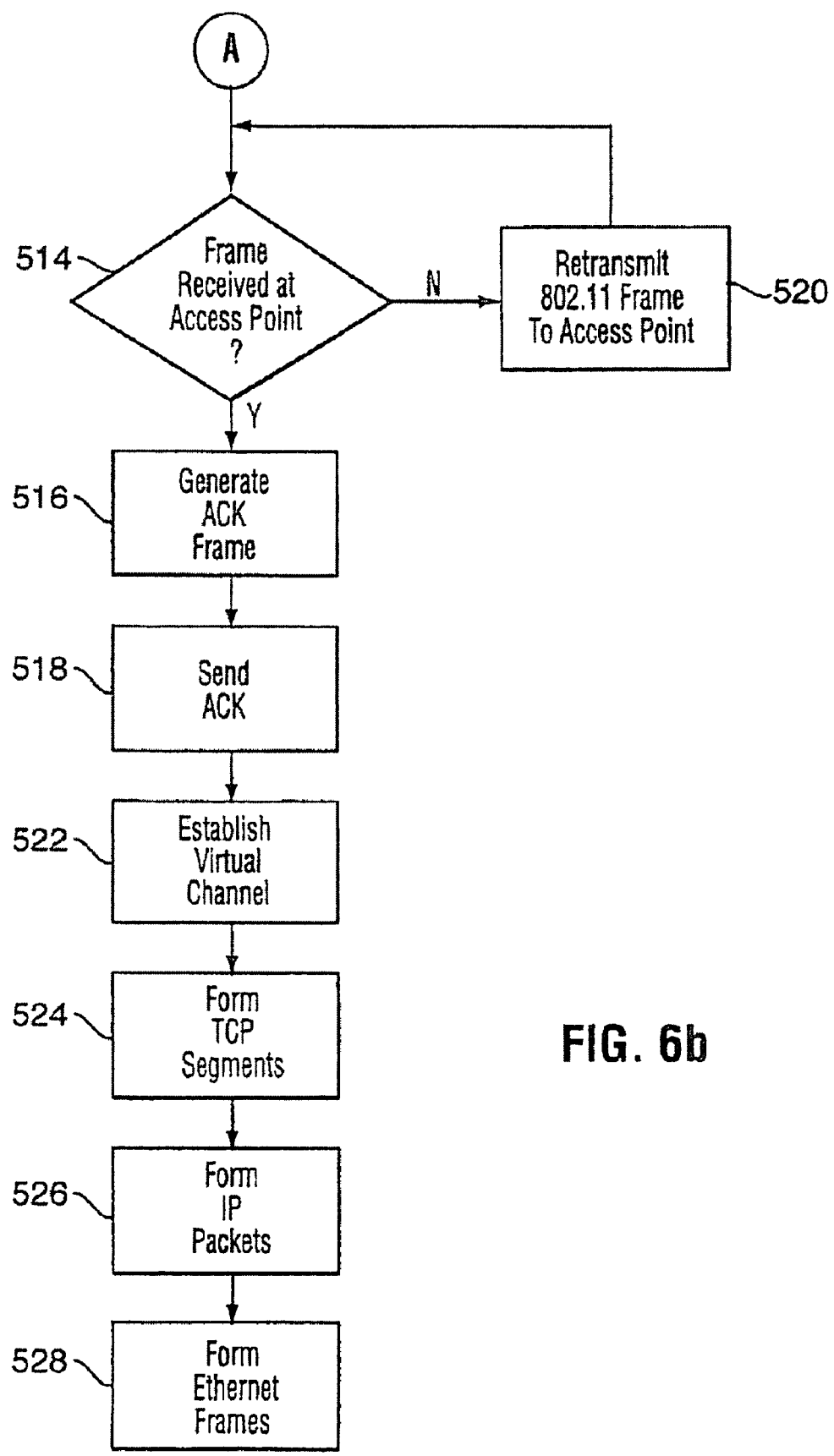

The operation of the wireless communication system 200 will now be described with reference to the flow chart shown in FIGS. 6a and 6b. Although the following discussion relates to the transmission of an electronic message between one of the wireless terminals 204 and one of the networked computers 206, as initiated by one of the wireless terminals 204, it should be appreciated that a similar discussion could relate to the transmission of an electronic message between one of the networked computers 206 and one of the wireless terminals 204, as initiated by one of the networked computers 206.

For a wireless terminal 204 to be able to communicate with one of the networked computers 206, preferably the wireless terminal 204 is assigned a "radio address" which is uniquely associated with the wireless terminal 204. Further, preferably each application software 230 is assigned a unique "session number" which is used by the access point server 210 to identify the data format of the message data received from the wireless terminal 204 and to identify the networked computer 206 to which the access point server 210 should forward the received message data.

After the radio address and session number(s) are assigned to the wireless terminal 204, the wireless terminal 204 can register with the wireless communication system 200. To facilitate registration, preferably each access point server 210 periodically broadcasts a "beacon" data frame which includes a "boot number" uniquely associated with the respective access point server 210. One purpose of the broadcast beacon is to allow the wireless terminal 204 to identify that the computer network 202 is "802.IQ enabled" and that the wireless terminal 204 is in range of an access point server 210. Upon receipt of the broadcast beacon, the wireless terminal 204 responds to the access point server 210 with the boot number and the assigned radio address. The access point server 210 associated with the specified boot number then stores the received radio address in the address cache 262.

It should be understood, however, that the radio address and session numbers need not be assigned prior to registration with the access point server 210. Instead, the radio address and session numbers may be dynamically assigned to the wireless terminal 204 by the access point server 210 upon registration. For instance, in one variation, the wireless terminal 204 responds to the broadcast beacon with a request for a radio address. Upon receipt of the radio address request, the access point server 210 allocates a radio address to the wireless terminal 210 from available radio address numbers, and then transmits the assigned radio address number back to the wireless terminal 210.

After the wireless terminal 204 has registered with the wireless communication system 200, at step 500 the user of the wireless terminal prepares an electronic message on the wireless terminal 204 using the appropriate application software 230 on the wireless terminal 204. When the message is complete, the application software 230 passes the electronic message to the 802.IQ protocol layer 236.

Upon receipt of the message data, at step 502 the message processor 240 of the 802.IQ protocol layer 236 determines whether it has sent a predetermined maximum number of messages to the access point server 210 without receiving any transport layer ACKs. Preferably, the predetermined maximum number of messages is eight (8). If the predetermined maximum number of messages remain unacknowledged, the message processor 240 waits for a transport layer ACK before proceeding further. However, if less than the predetermined maximum number of messages remain unacknowledged, the message processor 240 encapsulates the message data in a transport layer data segment, at step 504.

Figure 7A:
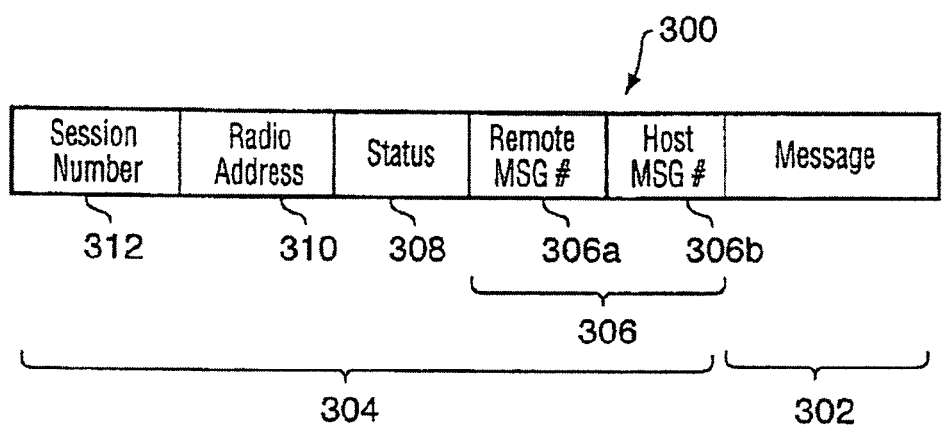
FIG. 7a is a schematic view of the transport layer data segment used for transmission of data between the wireless terminal and the access point server.

The structure of the transport layer data segment 300 is shown in FIG. 7a. As shown, the transport layer data segment 300 comprises the message data 302 (if any), and a transport layer header 304. The transport layer header 304 includes a message identifier 306, a message status identifier 308, a wireless terminal radio address 310, and a session number 312. The message identifier 306 comprises a remote message number 306a and a host message number 306b and are used for flow control of messages sent between the wireless terminal 204 and the access point server 210.

Flow control of a message is managed as follows. If a message is being transmitted from the wireless terminal 204 to the access point server 210, the remote message number 306a is assigned by the wireless terminal 204 and identifies the message being transmitted to the access point server 210, whereas the host message number 306b is a number assigned by the access point server 210 to the last message transmitted by the access point server 210 to the wireless terminal 204. On the other hand, if a message is being transmitted from the access point server 210 to the wireless terminal 204, the host message number 306b is a number assigned by the wireless terminal 204 and identifies the last message transmitted by the wireless terminal 204 to the access point server 210, whereas the remote message number 306a is a number assigned by the access point server 210, and identifies the message being transmitted to the wireless terminal 204.

The message status identifier 308 identifies the purpose of the transport layer data segment 300. For instance, the message status identifier "FM_OPEN" identifies that the wireless terminal 204 wishes to open a communications channel with the access point server 210, whereas the message status identifier "FM_CLOSE" identifies that the wireless terminal 204 wishes to close the communications channel. Typically, the wireless terminal 204 uses a "FM_OPEN" message upon registration to provide the access point server 210 with the assigned radio address.

The message status identifier "CELLULAR_ACKNOWL-EDGE" identifies that the wireless terminal 204 successfully received and assembled the message from the transport layer data segments transmitted by the access point server 210. The message status identifier "FM_CINIT" identifies that the wireless terminal 204 wishes the access point server 210 to perform a "cold" re-initialize, thereby instructing the access point server 210 to disregard all pending message acknowledgements. The message status identifier "FM_WINIT" identifies (using the message identifier) the last message received by the wireless terminal 204 from the access point server 210, thereby instructing the access point server 210 to retransmit all unacknowledged messages to the wireless terminal 204.

The radio address 310 is a 12-bit number which is used to uniquely identify the wireless terminal 204. The session number 312 is a four-byte number which is used to identify the data format of message data received from the wireless terminal 204, and thereby identify the networked computer 206 to which the access point server 210 should forward the received message data. In addition, the session number 312 is used in conjunction with the remote message number 306a and the host message number 306b to re-assemble a message from the received transport layer data segments 300.

Figure 7B:
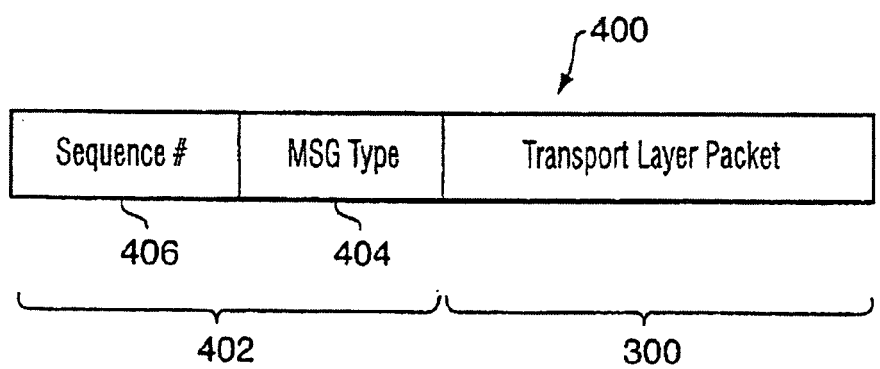
FIG. 7b is a schematic view of the link layer datagram used for transmission of data between the wireless terminal and the access point server.

Once the message processor 240 encapsulates the message data in a transport layer data segment 300, the message processor 240 passes the transport layer data segment 300 to the message monitor 242. At step 506, the message monitor 242 encapsulates the transport layer data segment 300 in a link layer datagram. The structure of the link layer datagram 400 is shown in FIG. 7b. As shown, the link layer datagram 400 comprises the transport layer data segment 300, and a link layer header 402. The link layer header 402 includes a message class identifier 404, and a sequence number 406. A sequence number is uniquely associated with each link layer datagram to allow the message monitor 242 to correctly associate link layer datagrams with the corresponding link layer ACKs. In contrast to the TCP/IP header, the link layer header 402 and the transport layer header 304 together is only 8 bytes in length.

The message class identifier 404 identifies the class of the transport layer data segment 300 included in the link layer datagram 400. For instance, the message class identifier "ACK" identifies that the transport layer data segment included in the link layer datagram is a transport layer ACK which acknowledges that the wireless terminal 204 successfully received and re-assembled the message transmitted from the access point server 210. The message class identifier "MSG from AP" identifies that the transport layer data segment included in the link layer datagram includes message data from the access point server 210. The message class identifier "MSG from TERM" identifies that the transport layer data segment included in the link layer datagram includes message data from the wireless terminal 204. The message class identifier "STS" identifies that the transport layer data segment included in the link layer datagram is the broadcast beacon, discussed above.

Once the message monitor 242 encapsulates the transport layer data segment 300 in a link layer datagram 400, the message monitor 242 passes the datagram 400 to the 802.11 protocol layer 234 in preparation for wireless transmission over the wireless network to the access point server 210. At step 508, the 802.11 protocol layer 234 determines whether the access point server 210 is communicating with another wireless terminal 204. As discussed above, if the wireless terminal 204 determines that the access point server 210 is already communicating with another wireless terminal 204, the terminal 204 selects a random backoff interval to wait before attempting to communicate with the access point server 210 again. When the wireless terminal 204 determines that the access point server 210 is free to communicate with the terminal 204, the 802.11 protocol layer 234 on the wireless terminal 204 transmits a Request to Send (RTS) frame to the access point server 210 and, upon receipt of a Clear to Send (CTS) frame, the 802.11 protocol layer 234 encapsulates the link layer datagrams 400 in a 802.11 frame header, at step 510. The 802.11 frame header includes a protocol identifier identifying that the encapsulated frame is a "802.IQ frame", a source MAC address associated with the wireless terminal 204, and a destination MAC address associated with the access point server 210. The 802.11 protocol layer then transmits the encapsulated frame over the wireless network, at step 512.

Upon receipt of the 802.11 data frame at step 514, the 802.11 protocol layer 274 on the access point server 210 verifies from the destination MAC address that the 802.11 data frame is intended for the access point server 210, and then removes the 802.11 frame header from the 802.11 data frame. The 802.11 protocol layer 274 then passes the resulting link layer datagram 400 to the 802.IQ layer 276 on the access point server 210. Upon receipt, the message monitor 282 of the 802.IQ layer 276 verifies the integrity of the received link layer datagram 400.

If the integrity of the link layer datagram is verified, at step 516 the message monitor 282 generates a link layer ACK datagram (including the sequence number and radio address extracted from the link layer header), and the passes the resulting datagram 400 to the 802.11 protocol layer 274 for transmission back to the wireless terminal 204. The access point server 210 then transmits the ACK datagram over the wireless network, at step 518. From the radio address included with the link layer header, the message monitor 242 on the wireless terminal 204 verifies that the received link layer ACK datagram is intended for the wireless terminal. If the radio address included with the link layer ACK datagram is matches the radio address assigned to the wireless terminal 204, the message monitor 242 on the wireless terminal 204 uses the session number included with the link layer header that the datagram 400 previously transmitted over the wireless network was received by the access point server 210. The message monitor 282 then removes the link layer header from the link layer datagram 400 received from the wireless terminal 204, and passes the resulting transport layer data segment 300 to the message processor 280.

On the other hand, if at step 514 the message monitor 282 on the access point server 210 is unable to verify the integrity of the received link layer datagrams 400, or if the access point server 210 does not receive the link layer datagram 400, the message monitor 282 does not generate a link layer ACK datagram. Accordingly, after waiting a retransmission time interval, the message monitor 242 on the wireless terminal 204 initiates retransmission of the link layer datagram 400 to the access point server 210 over the wireless network, at step 520. As discussed above, the retransmission time interval is initially equal to the running average of elapsed time between the instant a link layer datagram 400 is transmitted to the access point server 210 over the wireless network and the instant a link layer ACK datagram is received from the access point server 210 over the wireless network in response to the transmitted datagram.

Thereafter, if the message monitor 242 does not receive confirmation of a successful link layer datagram transmission to the access point server 210 after a predetermined maximum number of retransmission attempts, the message monitor 242 increases the retransmission time interval exponentially from the average acknowledgement time up to a predetermined maximum time limit, and attempts retransmission of the datagram after expiry of each new retransmission time interval. Once the message monitor 242 successfully retransmits the datagram 400, the message monitor 242 will again initially use the running average acknowledgement time when attempting retransmission of other link layer datagrams.

Upon receipt of the transport layer data segment 300, the message processor 280 on the access point server 210 extracts the message data 302 from the transport layer data segment 300, and re-assembles the message from the extracted message data 302 using the message identifier 306 and the session number 312 identified in each transport layer data segment 300. At this point, the message processor 280 may generate a transport layer ACK (in which the message status identifier 380 is "CELLULAR ACKNOWLEDGE") to indicate that the message was successfully received and assembled by the access point server 210. However, preferably the transport layer ACK is included with the application data response from the destination networked computer to the wireless terminal 204.

After the message is successfully re-assembled, the 802.IQ protocol layer 276 on the access point server 210 passes the assembled message to the application protocol layer 278, together with the session number specified in the transport layer header. The application protocol layer 278 queries the address cache 262 with the session number, and obtains the terminal number of the destination networked computer 206 which has the application software for receiving the message data transmitted by the wireless terminal 204. Using the retrieved terminal number, the application protocol layer 278 reformats the message data into a format suitable for receipt and processing by the destination computer application software.

The application protocol layer 278 then uses the TCP protocol layer 272, at step 522, to establish a virtual circuit with the TCP protocol layer on the appropriate destination network computer 206, in a manner similar to that discussed above with respect to the access point 110 and the destination networked computer 106. The TCP protocol layer 272 then formats the message into one or more TCP segments, at step 524, and passes the TCP segments to the IP protocol layer 270. Typically, the application protocol layer 278 will keep the virtual circuit open until the wireless terminal 204 closes its connection with the access point server 210 (eg. via a FM_CLOSE command).

Upon receipt of the TCP segments, the IP protocol layer 270 formats the TCP segments into one or IP segments, at step 526, using the specified terminal number to obtain the IP address of the destination network computer 206. The IP protocol layer 270 then passes the IP segments to the 802.3 protocol layer 268. Upon receipt of the IP datagrams, the 802.3 protocol layer 268 formats the IP datagrams into Ethernet frames and then transmits the Ethernet frames to the destination computer 206 over the wireless backbone 208.

If the destination computer 206 issues a response to the message, preferably the response includes the terminal number of the application software on the destination computer 206 which issued the response. Using the terminal number, the application protocol layer 278 queries the address cache 262 to determine the radio address and session number of the wireless terminal 204 to which the response should be transmitted, and then formats the response message into a format suitable for receipt and processing by the application software 230 on the identified wireless terminal 204. The access point server 210 then formats the formatted response message as a transport layer data segment 300 and a link layer datagram 400, as described above. The access point server 210 then transmits the resulting datagram over the wireless network for receipt by the identified wireless terminal 204.

As will be apparent from the foregoing description, in contrast to the prior art, the 802.IQ protocol establishes a communications channel between the wireless terminal 204 and the access point server 210, not between the wireless terminal 204 and the destination computer 206. Receipt of a link layer datagram 400 and a transport layer data segment are both acknowledged by the access point server 210, not the destination computer 206. Consequently, if the destination computer 206 fails to receive the datagram 400 due to a failure of the network backbone 208, bandwidth is not wasted by requiring the wireless terminal 204 to attempt retransmission of the datagram 400. Further, if the destination computer 206 fails to receive the datagram 400 due to the wireless terminal 204 temporarily drifting out of range of the access point server 210, re-initiation of the communications channel is established more rapidly than with the prior art since the 802.IQ layer only allows the retransmission interval to increase up to a limit of approximately 2 seconds.

Figure 8:
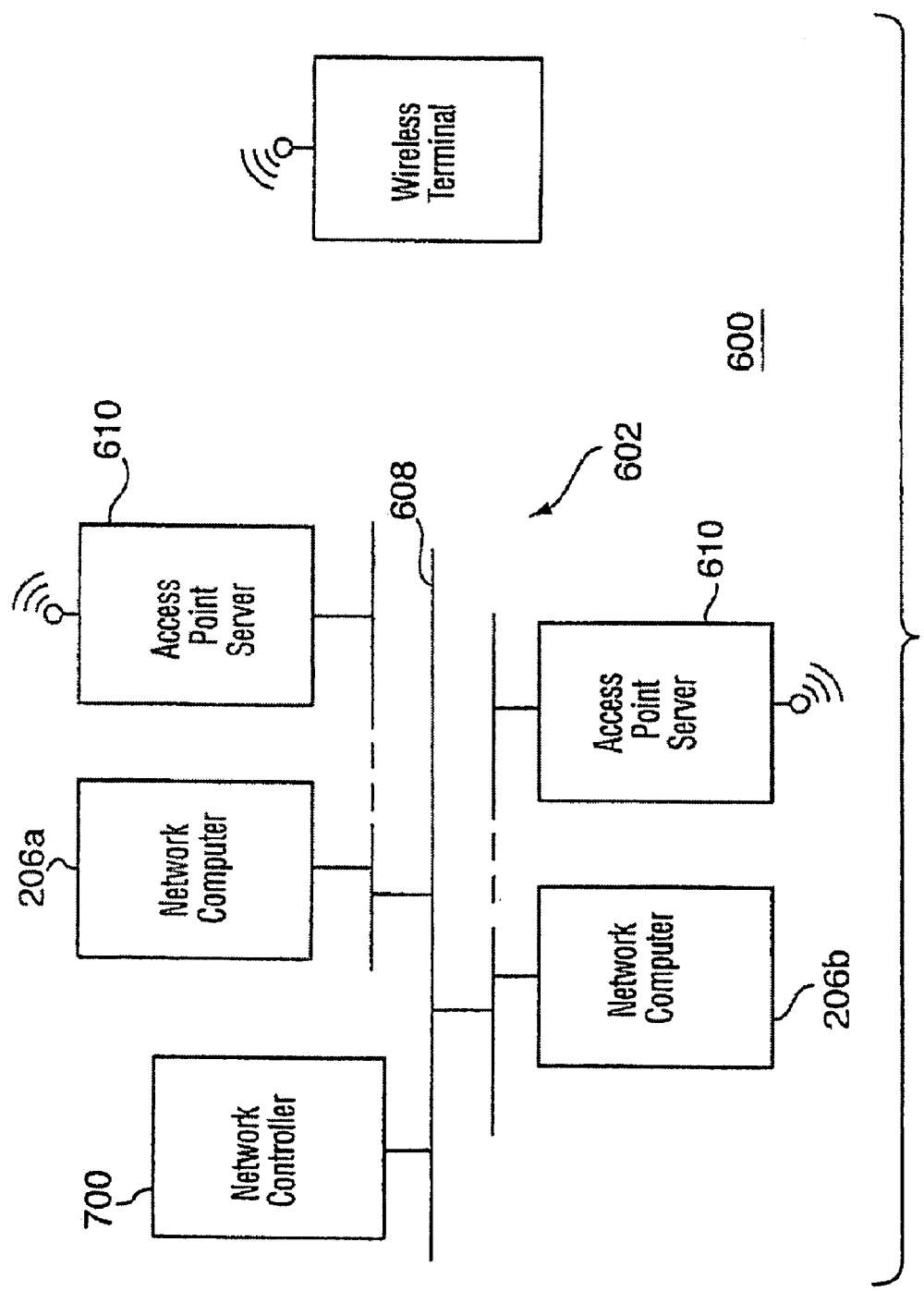
FIG. 8 is a schematic view of the wireless communication system, according to another embodiment of the present invention, showing the networked computers, the access point server, the network controller, and the wireless terminal.

The wireless communication system 200 described above is useful where the computer network 202 does not include IP sub-nets, so that the aforementioned IP subnet roaming problem will not be an issue. On the other hand, the wireless communication system 200 can be used even if the computer network 202 does include IP sub-nets (and corresponding access point servers 210) and the wireless terminals 204 roam between the IP sub-nets, provided however that each access point server 210 has mirror copies of the address cache 262. However, this approach is generally not advantageous since at least one of the access point servers 210 will waste wireless bandwidth by attempting to communicate with a wireless terminal 204 which has roamed out of contact with the access point server 210. A preferred solution to the IP sub-net roaming problem is shown in FIG. 8.

As shown in the figure, the wireless communication system, according to a second embodiment of the present invention, denoted generally as 600, comprises a computer network 602 and at least one of the wireless terminals 204 for communicating with the computer network 602. Unlike the computer network 202, the computer network 602 includes a plurality of IP sub-nets, and comprises a plurality of the networked computers 206, a network backbone 608 (such as Ethernet cable) interconnecting the networked computers 206, and a wireless access point server 610 coupled to each IP sub-net of the network backbone 608. The computer network 602 also includes a network controller 700 coupled to the network backbone 608 for facilitating communication between the wireless terminals 204 and the networked computers 206.

Figure 9:
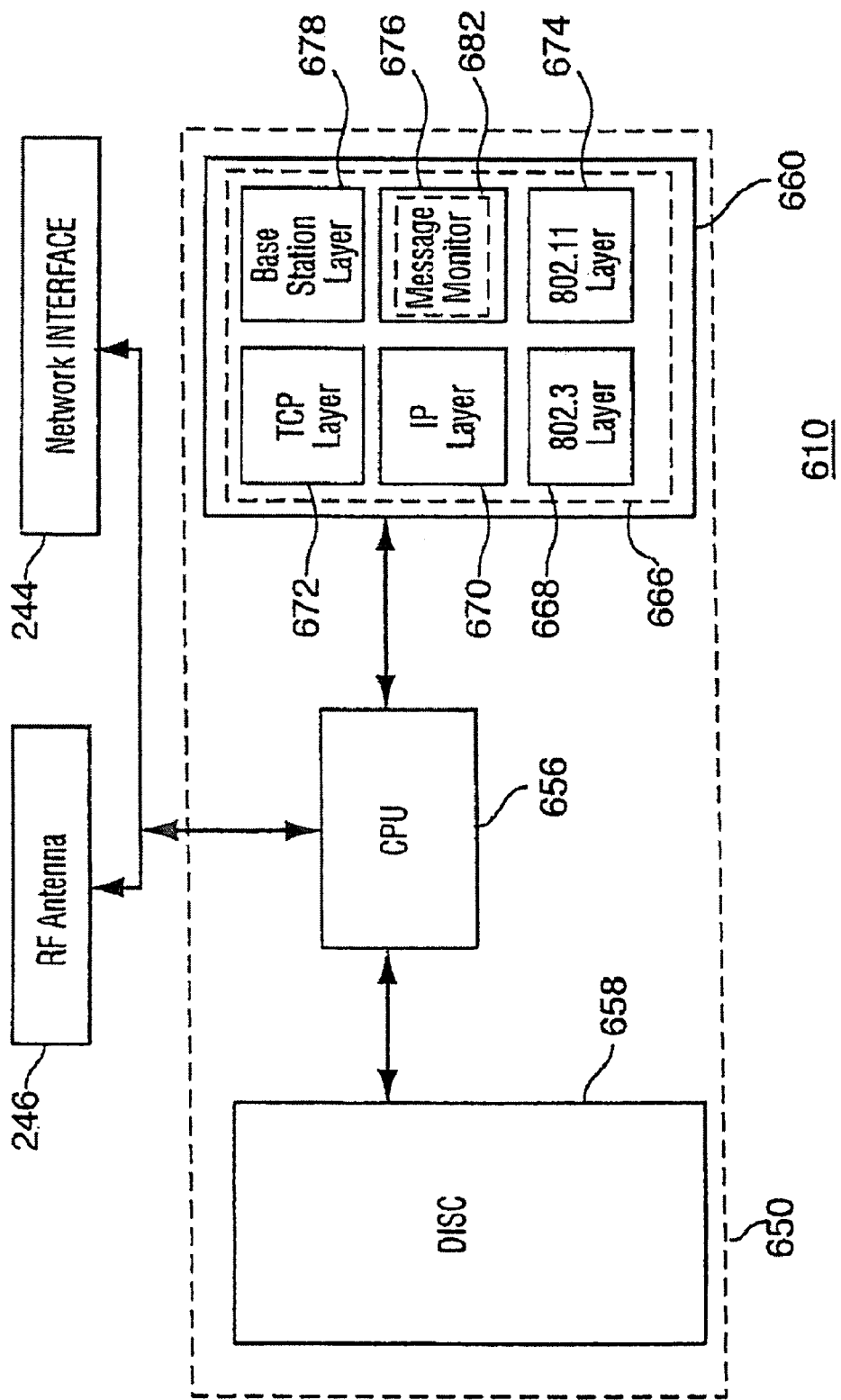
FIG. 9 is a schematic view of the access point server shown in FIG. 8.

Each access point server 610 is configured for wireless communication with the wireless terminals 204 over the wireless network and for land-based communication with the network controller 700 over the network backbone 608. As shown in FIG. 9, the access point server 610 is provided as a wireless-enabled networked computer server, and comprises a network interface 244 for land-based communication over the network backbone 608, an RF antenna 246 for wireless communication over the wireless network, and a data processing system 650 in communication with the network interface 244 and the antenna 246.

The data processing system 650 includes a central processing unit (CPU) 656 in communication with the network interface 244 and the antenna 246. The data processing system 650 also includes a non-volatile memory storage device (DISC) 658, such as a magnetic disc memory or electronic memory, and a read/write memory (RAM) 660 both in communication with the CPU 656. The DISC 658 includes instructions which, when loaded into the RAM 660, comprise processor instructions for the CPU 656. The processor instructions define in the RAM 660 a protocol stack 666 comprising an 802.3 protocol layer 668, an IP protocol layer 670 in communication with the 802.3 protocol layer 668, a TCP protocol layer 672 in communication with the IP protocol layer 670, an 802.11 protocol layer 674, an 802.IQ protocol layer 676 in communication with the 802.11 protocol layer 674, and a base station protocol layer 678 in communication with the TCP protocol layer 672 and the 802.IQ protocol layer 676.

The 802.IQ protocol layer 676 comprises a memory object defining a message monitor 682, however it should be understood that the message monitor 682 need not be implemented as a memory object but instead may be implemented in electronic hardware, if desired. In the OSI model, the message monitor 682 occupies the LLC sublayer of the data link layer, and is configured to convert link layer datagrams received over the wireless network into transport layer data segments, and to generate link layer ACK datagrams in response to the successful transmission of link layer datagrams to the access point server 610.

The message monitor 682 is also configured to generate link layer datagrams from transport layer data segments received from the base station protocol layer 678, and to monitor the transmission of the link layer datagrams to the wireless terminal 204 by waiting for the receipt of link layer ACK datagrams transmitted by the wireless terminal 204 in response to the successful transmission of the link layer datagrams over the wireless network, and by maintaining a running average of the transmission acknowledgement times for the link layer datagrams which the access point server 610 successfully transmitted to the wireless terminal 204.

In addition, the message monitor 682 is configured to initiate retransmission of any link layer datagrams which were transmitted by the access point server 610 but which were not received by the wireless terminal 204. To do so, the message monitor 682 is configured such that if it does not receive a link layer ACK datagram within a retransmission time interval (initially equal to the average acknowledgement time for link layer datagrams which the access point server 610 successfully transmitted to the wireless terminal 204), the message monitor 682 initiates retransmission of the link layer datagram again. Preferably, the message monitor 682 initiates retransmission of the link layer datagrams after expiry of the original retransmission time interval (for the transmission of link layer datagrams to the wireless terminal 204), and then increases the retransmission time interval from the average acknowledgement time, after a predetermined number of retransmission attempts, up to a predetermined upper limit time.

The base station protocol layer 678 is configured to provide notification to the network controller 700 that the access point server 610 is connected to the network backbone 608, and to allow the network controller 700 to establish a TCP/IP connection with the access point server 610. Further, the base station protocol 678 is configured to process link layer datagrams received from the network controller 700 over the TCP/IP connection into a format for use by the 802.IQ layer 676, and to process transport layer data segments received from the 802.IQ layer 676 into a format for use by the network controller 700.

Figure 10:
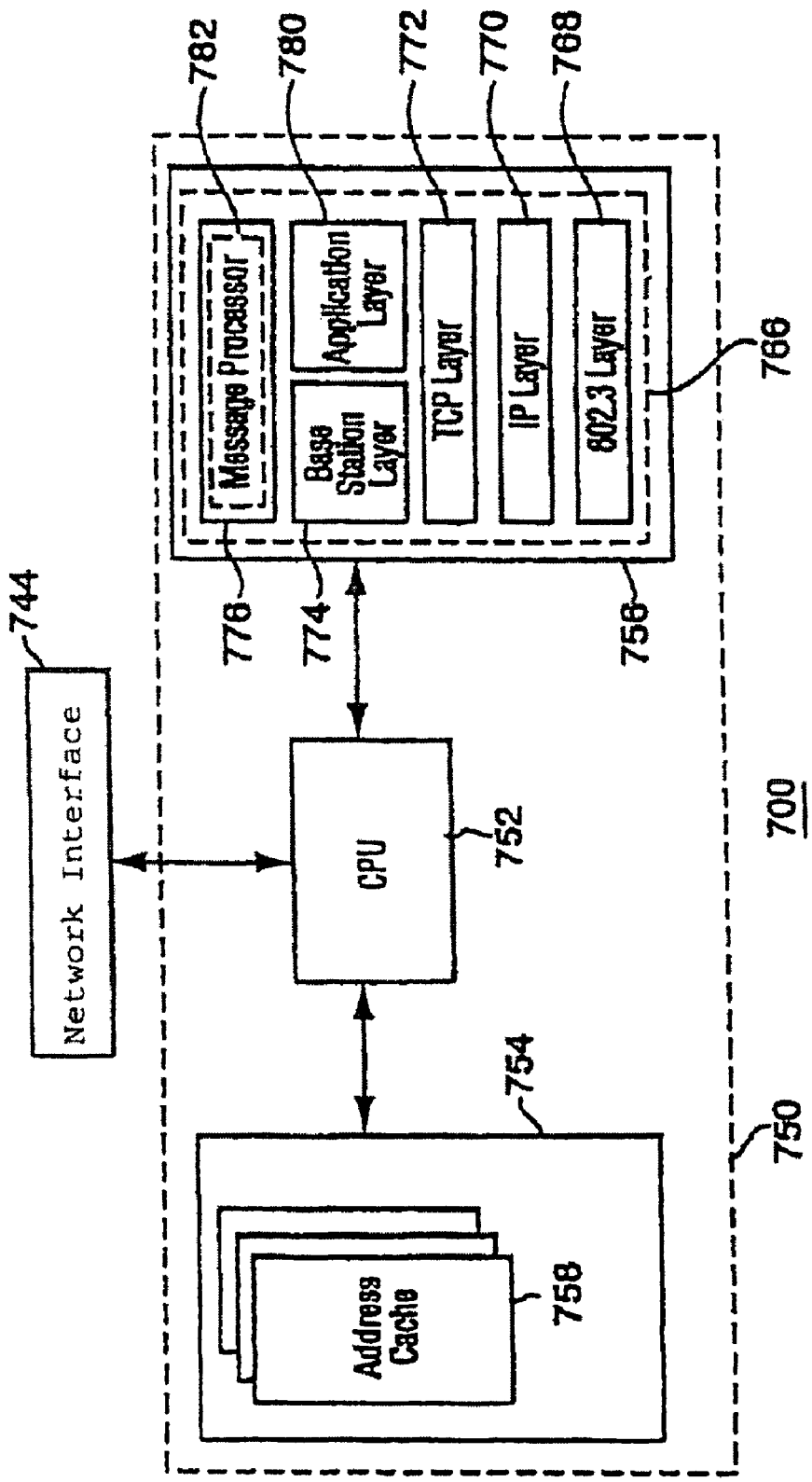
FIG. 10 is a schematic view of the network controller shown in FIG. 8.

The network controller 700 is configured for wired communication with the access point servers 610 and the networked computers 206 over the network backbone 608. As shown in FIG. 10, the network controller 700 is provided as a networked computer server, and comprises a network interface 744 for wired communication over the network backbone 608, and a data processing system 750 in communication with the network interface 744.

The data processing system 750 includes a central processing unit (CPU) 752 in communication with the network interface 744. The data processing system 750 also includes a non-volatile memory storage device (DISC) 754, such as a magnetic disc memory or electronic memory, and a read/write memory (RAM) 756 both in communication with the CPU 752. The DISC 754 includes an address cache 758 which includes wireless terminal radio addresses and session numbers, access point server IP addresses, and network computer terminal numbers and IP addresses. The DISC 754 also includes instructions which, when loaded into the RAM 756, comprise processor instructions for the CPU 752. The processor instructions define in the RAM 756 a protocol stack 766 comprising an 802.3 protocol layer 768, an IP protocol layer 770 in communication with the 802.3 protocol layer 768, a TCP protocol layer 772 in communication with the IP protocol layer 770, a base station protocol layer 774 in communication with the TCP protocol layer 772, an 802.IQ protocol layer 776 communication with the base station protocol layer 778, and an application protocol layer 780 in communication with the TCP protocol layer 772 and the 802.IQ protocol layer 776. The base station protocol layer 774 is configured to obtain the IP address of each access point server 610, and to establish a TCP/IP connection with each access point server 610. Further, the base station protocol 774 is configured to process link layer datagrams received from each access point server 610 over the TCP/IP connection into a format for use by the destination networked computer 206, and to process transport layer data segments received from the networked computers into a format for use by the access point server 610.

The 802.IQ protocol layer 776 comprises a memory object defining a message processor 782, however it should be understood that the message processor 782 need not be implemented as a memory object but instead may be implemented in electronic hardware, if desired. In the OSI model, the message processor 782 occupies the transport layer and the network layer. The message processor 782 is configured to receive message data which originated from the networked computers 206 and to generate transport layer data segments from the message data. The message processor 782 is also configured to extract the message data from transport layer data segments received from the base station protocol layer 774, and to acknowledge the receipt of the transport layer data segments by generating transport layer ACK data segments upon receipt and successful assembly of the message data contained in the transport layer data segments. The application protocol layer 780 is configured to map message data between the 802.IQ protocol layer 776 and TCP ports on the networked computers 206 using the radio numbers, session numbers and terminal numbers transmitted with the transport layer data segments.

The operation of the wireless communication system 600 will now be described. Although the following discussion relates to the transmission of an electronic message between one of the wireless terminals 204 and one of the networked computers 206, as initiated by one of the wireless terminals 204, it should be appreciated that a similar discussion could relate to the transmission of an electronic message between one of the networked computers 206 and one of the wireless terminals 204, as initiated by one of the networked computers 206.

As above, preferably each wireless terminal 204 is assigned a radio address which is uniquely associated with the wireless terminal 204, and the application software 230 on each wireless terminal 204 is assigned a unique session number which is used by the network controller 700 to identify the data format of the message data received from the wireless terminal 204 and to identify the networked computer 206 to which the networked controller 700 should forward the received message data. At power-up, the base station protocol layer 774 of the network controller 700 opens a TCP port with each access point server 610, and then transmits a command to each access pointer server 610 causing each access point server 610 to initialize itself and to acknowledge its existence to the network controller 700 by providing the base station protocol layer 774 with each respective IP address on the network backbone 608.

After each access point server 610 acknowledges its existence to the network controller 700, each access point server 610 periodically broadcasts a beacon data frame to allow each wireless terminal 204 to identify that it is in range of an access point server 610. As above, the beacon data frame includes a boot number uniquely associated with the access point server 610. Upon receipt of the broadcast beacon, the wireless terminal 204 registers with the wireless communication system 600 by responding to the access point server 610 with the received boot number and its assigned radio address. The access point server 610 associated with the specified boot number then transmits the received radio address and boot number to the network controller 700 for storage in the address cache 758 of the network controller 700.

As described above, after the wireless terminal 204 registers with the wireless communication system 600, the user of the wireless terminal 204 prepares an electronic message on the wireless terminal 204. If less than the predetermined maximum number of messages remain unacknowledged, the message processor 240 encapsulates the message in a transport layer data segment, and the message monitor 242 encapsulates the transport layer data segment 300 in a link layer datagram 400. If the access point server 610 is already communicating with another wireless terminal 204, the terminal 204 selects a random backoff interval to wait before attempting to communicate with the access point server 610 again. When the wireless terminal 204 determines that the access point server 610 is free to communicate with the terminal 204, the wireless terminal 204 transmits the link layer datagram over the wireless network.

Upon receipt, the message monitor 682 of the 802.IQ layer 676 on the access point server 610 verifies the integrity of the link layer datagram 400. If the integrity of the link layer datagram is verified, the message monitor 682 extracts the transport layer data segment 300 from the link layer datagrams, and passes the transport layer data segment 300 to the base station protocol layer 678. The message monitor also generates a link layer ACK datagram (including the sequence number and radio address extracted from the link layer header), and passes the resulting link layer ACK 400 to the 802.11 protocol layer 674 for transmission back to the wireless terminal 204. The access point server 610 then transmits the ACK 400 over the wireless network. If the radio address included with the link layer ACK 400 matches the radio address assigned to the wireless terminal 204, the message monitor 242 on the wireless terminal 204 uses the session number included with the link layer header to verify that the data segment 400 previously transmitted over the wireless network was received by the access point server 610. On the other hand, if the message monitor 682 on the access point server 610 is unable to verify the integrity of the received link layer datagram 400, or does not receive the link layer datagram 400, the message monitor 682 does not generate a link layer ACK datagram. Accordingly, after waiting a retransmission time interval, the message monitor 242 on the wireless terminal 204 initiates retransmission of the link layer datagram 400 to the access point server 610 over the wireless network.

As discussed above, the retransmission time interval is initially equal to the running average of elapsed time between the instant a link layer datagram 400 is transmitted to the access point server 610 over the wireless network and the instant a link layer ACK datagram is received from the access point server 610 over the wireless network in response to the transmitted data segment. Thereafter, if the message monitor 242 does not receive confirmation of a successful link layer datagram transmission to the access point server 610 after a predetermined maximum number of retransmission attempts, the message monitor 242 increases the retransmission time interval exponentially from the average acknowledgement time up to a predetermined maximum time limit, and attempts retransmission of the data segment after expiry of each new retransmission time interval.

Upon receipt, the base station protocol layer 678 encapsulates the transport layer data segment 300 in a base station header which indicates that the encapsulated transport layer data segment includes message data from one of the wireless terminals 204 (as opposed to, for example, the IP address of the access point server 610). The base station protocol layer 678 then uses the TCP protocol layer 672 to establish a virtual circuit with the TCP protocol layer 772 on the network controller 700. The TCP protocol layer 672 formats the encapsulated link layer datagrams into one or more TCP segments, and transmits the TCP segments to the base station protocol layer 774 on the network controller 700 over the virtual circuit. The base station protocol layer 774 removes the base station header from the encapsulated link layer datagram, and passes the resulting transport layer data segment 300 to the 802.IQ protocol layer 776.

Upon receipt of the transport layer data segment 300, the message processor 782 extracts the message data 302 from the transport layer data segment 300, and reassembles the message from the extracted message data. At this point, the message processor 782 may generate a transport layer ACK (in which the message status identifier 380 is "CELLULAR ACKNOWLEDGE") to indicate that the message was successfully received and assembled by the network controller 700. However, preferably the transport layer ACK is included with the application data response from the destination networked computer 206 to the wireless terminal 204.

After the message is successfully re-assembled, the 802.IQ protocol layer 776 passes the assembled message to the application protocol layer 780, together with the session number specified in the transport layer header. The application protocol layer 780 queries the address cache 758 with the session number, and obtains the terminal number of the destination networked computer 206 which has the application software for receiving the message data transmitted by the wireless terminal 204. Using the retrieved terminal number, the application protocol layer 780 reformats the message data into a format suitable for receipt and processing by the destination computer 206 application software.

The application protocol layer 700 then uses the specified terminal number to obtain the IP address of the destination network computer 206, and then uses the TCP protocol layer 772 to establish a virtual circuit with the TCP protocol layer on the appropriate destination network computer 206. The application protocol layer 700 then transmits the message data to the destination networked computer 206 over the virtual circuit.

If the destination computer 206 issues a response to the message, preferably the response includes the terminal number of the application software on the destination computer 206 which issued the response. Using the terminal number, the application protocol layer 780 on the network controller 700 queries the address cache 758 to determine the radio address and session number of the wireless terminal 204 to which the response should be transmitted, and then formats the response message into a format suitable for receipt and processing by the application software 230 on the identified wireless terminal 204. Using the radio address, the application protocol layer 780 also determines the IP address of the access point server 610 through which the wireless terminal 204 communicates. The network controller 700 then transmits the message over the TCP/IP virtual channel established with the access point server 610. The access point server 610 then transmits the resulting data over the wireless network for receipt by the identified wireless terminal 204.

Thus far in the discussion, it has been assumed that the wireless terminal 204 remains in communication with the access point server 610 with which it used to register itself with the wireless communication system 600. However, if, subsequent to registration, the wireless terminal 204 drifts out of range of the access point server 610 initially associated with the wireless terminal 204 and into range of another access point server 610, the wireless terminal 204 will receive a different boot number from the new access point server 610 (via the broadcast beacon), and respond to the new access point server 610 with the wireless terminal's assigned radio address and the newly received boot number. The new access point server 610 will then transmit the received radio address and boot number to the network controller 700, and the network controller 700 (using the radio address of the wireless terminal 204) will update the boot number entry in the address cache 758 for the wireless terminal 204. Thereafter, any communication from one of the networked computers 206 to the wireless terminal 204 will be directed to the appropriate access point server 610. In this manner, the network controller 700 is able to keep track of each wireless terminal 204 as it roams between access point servers 210. As will be appreciated, this mechanism of dealing with roaming wireless terminals 204 requires significantly less administration overhead than the prior art.

The present invention is defined by the claims appended hereto, with the foregoing description being illustrative of preferred embodiments of the present invention. Persons of ordinary skill may envisage certain modification to the described embodiments which, although not explicitly described herein, do not depart from the scope of the invention, as defined by the appended claims.

I claim:

1. A network controller for a mobile communication between a wireless mobile device and a network device, the network controller including a TCP layer for communications with the network device and a current access point associated with the mobile device, characterized in that the network controller comprises:

a first protocol layer configured to maintain a first virtual circuit between the network controller and the network device;

a second protocol layer configured to maintain a second virtual circuit between the network controller and the current access point; and a third protocol layer configured to bridge a communication between the first virtual circuit and the second virtual circuit through mapping, wherein the second protocol layer is configured to extract a first data segment encapsulated into a second data segment received via the second virtual circuit and pass it to the third protocol layer for transmission to the network device, the first data segment comprising message data from the mobile device and a session number for identifying a network device, wherein the third protocol layer is configured to extract the message data from the first data segment and map the extracted message data to the first virtual circuit based on the session number;

and wherein the second protocol layer is further configured to receive data from the third protocol layer and process the received data for transmission to the current access point.

2. The network controller according to claim 1, further comprising a storage device for storing information including a boot number for identifying the current access point.

3. The network controller according to claim 1, wherein the third protocol layer is configured to extract the message data of the mobile device from the first data segment, and map the extracted message data to the first virtual circuit based on the session number that identifies a data format of the message data.

4. The network controller according to claim 1, wherein the first data segment comprises a header, and wherein the first data segment header has a length less than a TCP/IP header.

5. The network controller according to claim 1, wherein the first data segment is a transport layer data segment, and wherein the second data segment is a link layer datagram, and wherein the message data is encapsulated in the transport layer data segment.

6. The network controller according to claim 5, wherein the transport layer data segment comprises a transport layer header having the session number that is used for identifying a data format of the message data.

7. The network controller according to claim 5, wherein the transport layer header has a length less than a TCP/IP header.

8. The network controller according to claim 5, wherein the third protocol layer is configured to bridge the communication by mapping the transport layer data segment between the virtual circuits.

9. The network controller according to claim 1, wherein the first virtual circuit is maintained with a TCP protocol layer on the network device, the second virtual circuit being maintained with a TCP protocol layer on the access point.

10. A system for a mobile communication, comprising:
a network controller according to claim 1; and
one or more access points, each being accessible from the mobile device and periodically broadcasting a beacon data frame having a boot number uniquely assigned to the access point to allow the mobile device to identify that it is in range of the access point, and transmitting the boot number to the network controller when receiving a response with the boot number from the mobile device.

11. The system according to claim 10, wherein the access point comprises a fourth protocol layer for communication with the network controller and the mobile device, and wherein the fourth protocol layer is associated with the second protocol layer.

12. A method for a mobile communication between a mobile device and a network device via a network controller, the network controller including a TCP layer for communications with the network device and a current access point associated with the mobile device, characterized in that the method comprises the steps of:
at the network controller, controlling a communication between the network device and the current access point, the network controller having a first protocol layer configured for maintaining a first virtual circuit between the network controller and the network device, a second protocol layer configured for maintaining a second virtual circuit between the network controller and the current access point, and a third protocol layer configured for bridging a communication between the first virtual circuit and the second virtual circuit;
the step of controlling including:
at the second protocol layer, extracting a first data segment encapsulated into a second data segment received from the current access point via the second virtual circuit and passing it to the third protocol layer for transmission to the network device, the first data segment comprising message data from the mobile device and a session number for identifying the network device;
at the third protocol layer, extracting the message data from the first data segment and mapping the extracted message data to the first virtual circuit based on the session number; and
at the second protocol layer, receiving data from the third protocol layer and processing the received data for transmission to the current access point.

13. The method according to claim 12, further comprising the step of:
at the current access point, encapsulating the first data segment into the second data segment.

14. The method according to claim 12, wherein the first data segment comprises a header, and wherein the first data segment header has a length less than a TCP/IP header.

15. The method according to claim 12, wherein the first data segment is a transport layer data segment, and wherein the second data segment is a link layer datagram.

16. The method according to claim 15, wherein the transport layer data segment comprises a header, and wherein the transport data segment header has a length less than a TCP/IP header.

17. The method according to claim 12, wherein the session number is used to identify a data format of the message data received from the mobile device.

18. The method according to claim 12, comprising the step of:
at the access point, periodically broadcasting a beacon data frame having a boot number uniquely assigned to the access point to allow the mobile device to identify that it is in range of the access point, and transmitting the boot number to the network controller when receiving a response with the boot number from the mobile device.

* * * * *